(12) United States Patent
Kong et al.

(10) Patent No.: US 12,554,352 B2
(45) Date of Patent: *Feb. 17, 2026

(54) TOUCH DISPLAY PANEL AND MANUFACTURING METHOD THEREFOR

(71) Applicant: AUO Corporation, Hsinchu (TW)

(72) Inventors: Li-xiao Kong, Kunshan (CN); Xin Liu, Kunshan (CN); Chun-Da Tu, Hsinchu (TW); Fu Liang Lin, Hsinchu (TW)

(73) Assignee: AUO CORPORATION, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/967,267

(22) Filed: Dec. 3, 2024

(65) Prior Publication Data

US 2025/0103155 A1 Mar. 27, 2025

Related U.S. Application Data

(63) Continuation of application No. 18/388,999, filed on Nov. 13, 2023, now Pat. No. 12,189,877.

(30) Foreign Application Priority Data

Sep. 26, 2023 (CN) .......................... 202311253324.1

(51) Int. Cl.
*G06F 3/041* (2006.01)

(52) U.S. Cl.
CPC ........ *G06F 3/0412* (2013.01); *G06F 3/04164* (2019.05); *G06F 2203/04103* (2013.01)

(58) Field of Classification Search
CPC ............... G06F 3/0412; G06F 3/04164; G06F 2203/04103; G06F 3/0443
See application file for complete search history.

(56) References Cited

U.S. PATENT DOCUMENTS

| | | | |
|---|---|---|---|
| 10,229,964 B2 | 3/2019 | Kim | |
| 10,256,257 B2 * | 4/2019 | French | H10D 86/411 |
| 11,170,727 B2 | 11/2021 | Choi | |
| 11,189,680 B2 * | 11/2021 | Kim | H10K 59/124 |
| 11,307,446 B2 | 4/2022 | Ahn | |
| 11,659,757 B2 * | 5/2023 | Sun | G06F 3/0446 345/173 |
| 11,895,884 B2 | 2/2024 | Kim | |

(Continued)

FOREIGN PATENT DOCUMENTS

| | | |
|---|---|---|
| CN | 108461522 A | 8/2018 |
| CN | 116301427 A | 6/2023 |

*Primary Examiner* — Benyam Ketema
(74) *Attorney, Agent, or Firm* — WPAT, PC

(57) ABSTRACT

The invention provides a touch display panel and a manufacturing method therefor. The touch display panel comprises a substrate; a display region disposed on the substrate; an opening region disposed on the substrate and adjacent to the display region; a plurality of touch electrodes disposed in the display region; a plurality of signal lines electrically connected to the touch electrodes; a common voltage loop surrounding the display region and having a first portion and a second portion spaced apart and adjacent to the opening region; a connection structure disposed between the first portion and the second portion; and a plurality of first dummy signal lines electrically connected to the connection structure; wherein the first portion is electrically connected to the second portion through the connection structure.

12 Claims, 4 Drawing Sheets

(56) References Cited

U.S. PATENT DOCUMENTS

| | | | |
|---|---|---|---|
| 11,895,897 B2* | 2/2024 | Sun | G06F 3/0412 |
| 2017/0249896 A1* | 8/2017 | Kim | H10K 59/131 |
| 2019/0079622 A1* | 3/2019 | Choi | G06F 3/0446 |
| 2020/0064968 A1* | 2/2020 | Kim | H10K 59/8792 |
| 2021/0193756 A1* | 6/2021 | Oh | H10K 59/353 |
| 2021/0357079 A1* | 11/2021 | Song | G06F 3/0412 |
| 2021/0397320 A1* | 12/2021 | Ye | G06F 3/0448 |
| 2022/0300137 A1* | 9/2022 | Sun | G06F 3/0446 |
| 2022/0384533 A1* | 12/2022 | Jang | H10K 59/40 |
| 2023/0049317 A1* | 2/2023 | Wang | G06F 3/0443 |
| 2023/0400952 A1* | 12/2023 | Yan | G06F 3/0446 |
| 2024/0077981 A1* | 3/2024 | Gogte | G06F 3/0443 |

* cited by examiner

TOUCH DISPLAY PANEL AND MANUFACTURING METHOD THEREFOR

CROSS-REFERENCE TO RELATED APPLICATIONS

This application is a Continuation Application of U.S. patent application Ser. No. 18/388,999, filed on Nov. 13, 2023, and entitled "TOUCH DISPLAY PANEL AND MANUFACTURING METHOD THEREFOR", the entire contents of which are incorporated herein by reference.

Some references, if any, which may include patents, patent applications and various publications, may be cited and discussed in the description of this disclosure. The citation and/or discussion of such references, if any, is provided merely to clarify the description of the present disclosure and is not an admission that any such reference is "prior art" to the disclosure described herein. All references listed, cited and/or discussed in this specification are incorporated herein by reference in their entireties and to the same extent as if each reference was individually incorporated by reference.

BACKGROUND OF THE INVENTION

1. Field of the Invention

The invention relates to a touch display panel and a manufacturing method therefor, and particularly to a touch display panel and a manufacturing method therefor that can improve display quality and avoid bright line defect.

2. Related Art

With development of science and technology, display devices are widely applied to many electronic products, such as, cellular phones, tablet computers, watches, vehicles, and so on.

As for the same series of display devices, sizes and resolutions are the same, and the difference is often only in difference of sizes of opening (flowing sea), such as, IPHONE12 and IPHONE13. When manufacturing the same series of display devices with different openings, different mask plates shall be developed correspondingly, causing an increase of cost. If a part of the mask plate is shared, for example, sharing the mask plates for forming the touch electrodes, after cutting and grinding, the common voltage loop (COM-Ring) in the display panel with a large opening may have local disconnection, causing that a part of dummy signal lines cannot be connected to the common voltage loop, and if another end of the part of dummy signal lines disconnects connection with other lines during use or testing, the part of dummy signal lines is in a floating state, is easily affected by potential of other film layers (such as, the pixel electrode layer), and cannot sustain the common voltage to have bright line.

Therefore, how to provide a touch display panel and a manufacturing method therefor that avoid floating of the dummy signal lines and improve display quality is actually one of the problems to be solved.

SUMMARY OF THE INVENTION

The embodiments of the invention provide a touch display panel and a manufacturing method therefor that can avoid floating of the dummy signal lines and improve display quality.

A touch display panel in one embodiment of the invention comprises a substrate; a display region disposed on the substrate; an opening region disposed on the substrate and adjacent to the display region; a plurality of touch electrodes disposed in the display region; a plurality of signal lines electrically connected to the touch electrodes; a common voltage loop surrounding the display region and having a first portion and a second portion spaced apart and adjacent to the opening region; a connection structure disposed between the first portion and the second portion; and a plurality of first dummy signal lines electrically connected to the connection structure; wherein the first portion is electrically connected to the second portion through the connection structure.

In the touch display panel, a vertical projection of the connection structure on the substrate is step-shaped.

In the touch display panel, the signal lines, the first dummy signal lines and the connection structure are located at the same film layer.

In the touch display panel, the film layer is a metal layer.

In the touch display panel, the common voltage loop is located at a transparent conductive layer, and the touch display panel further comprises: a first insulating layer disposed on the substrate, the metal layer disposed on the first insulating layer, and the connection structure disposed at the metal layer; and a second insulating layer disposed on the first insulating layer and covering the metal layer, the transparent conductive layer disposed on the second insulating layer, the second insulating layer having an opening exposing a part of the connection structure, and the transparent conductive layer where the common voltage loop is located extending into the opening and contacting the part of the connection structure exposed.

In the touch display panel, each of the plurality of first dummy signal lines has a first end and a second end opposite to each other, the first end is electrically connected to the connection structure, and the second end is electrically connected to the common voltage loop.

In the touch display panel, the touch display panel further comprises a plurality of second dummy signal lines electrically connected to the common voltage loop.

In the touch display panel, the opening region comprises a bottom side and opposite two lateral sides, the second portion is adjacent to the bottom side, and the first portion and the second portion are spaced apart at the two lateral sides.

In the touch display panel, a vertical projection of the connection structure on the substrate is located between vertical projections of the first portion and the second portion on the substrate.

In the touch display panel, the plurality of first dummy signal lines are interlaced with a part of the signal lines, and the part of the signal lines is adjacent to while does not contact the connection structure.

In the touch display panel, the connection structure and the common voltage loop are located at different film layers.

A method for manufacturing a display panel in one embodiment of the invention comprises providing a substrate having a display region and an opening region adjacent to each other; forming a plurality of signal lines and a plurality of first dummy signal lines in the display region; and forming a plurality of touch electrodes in the display region, the plurality of touch electrodes electrically connected to the plurality of signal lines; wherein the manufacturing method further comprises forming a common voltage loop on the substrate, the common voltage loop surrounding the display region, and having a first portion and a second portion spaced apart and adjacent to the opening region; and forming a connection structure electrically connected between the first portion and the second portion, and the plurality of first dummy signal lines electrically connected to the connection structure.

In the method, a vertical projection of the connection structure on the substrate is step-shaped.

In the method, each of the plurality of first dummy signal lines has a first end and a second end opposite to each other, the first end is electrically connected to the connection structure, and the second end is electrically connected to the common voltage loop.

In the method, the signal lines, the first dummy signal lines and the connection structure are located at the same film layer.

Hereinafter the invention is described in details combining with the accompanying drawings and the specific embodiments, but the invention is not limited thereto.

DETAILED EMBODIMENTS OF THE INVENTION

Figure 1:
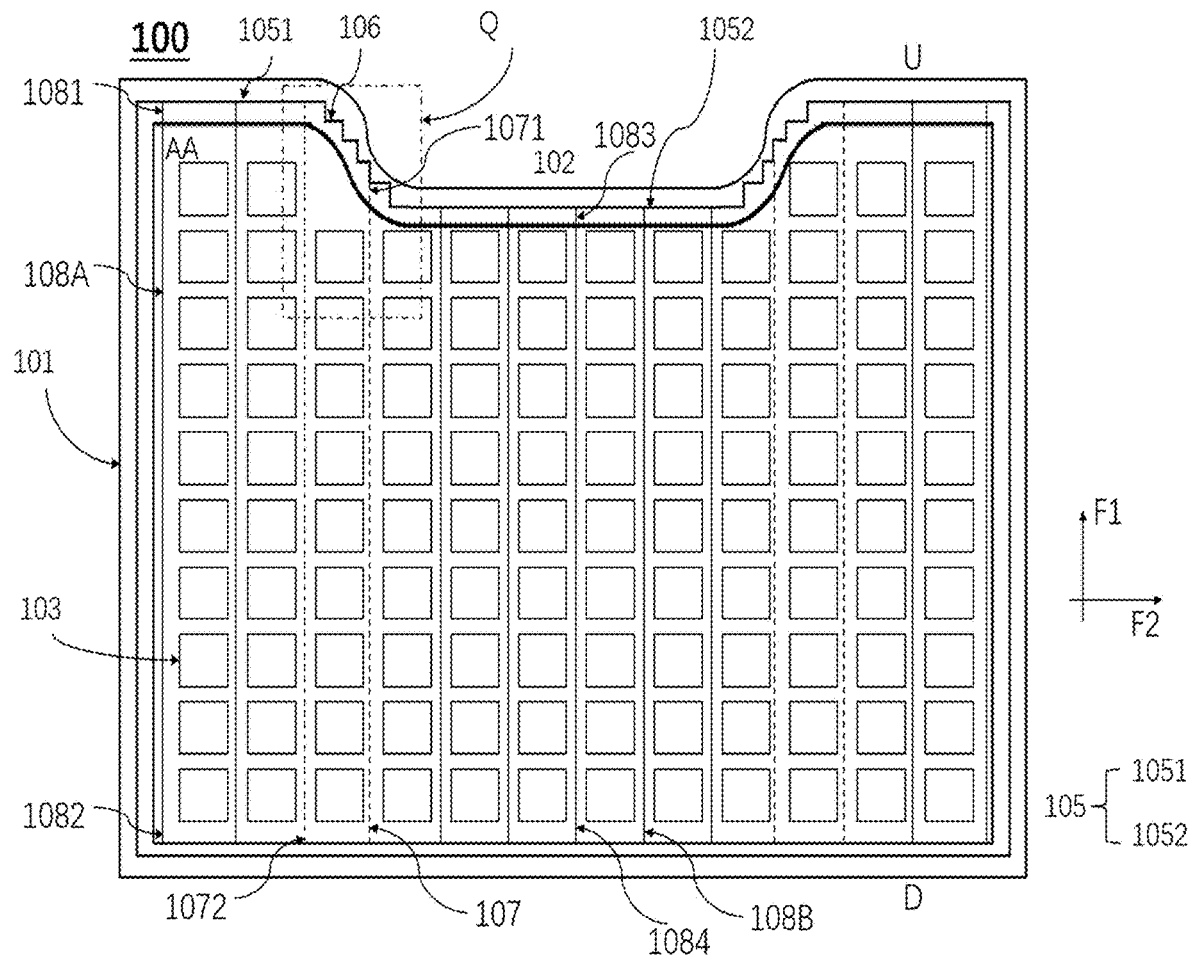
FIG. 1 is a structural diagram of a touch display panel in one embodiment of the invention.
Figure 2:
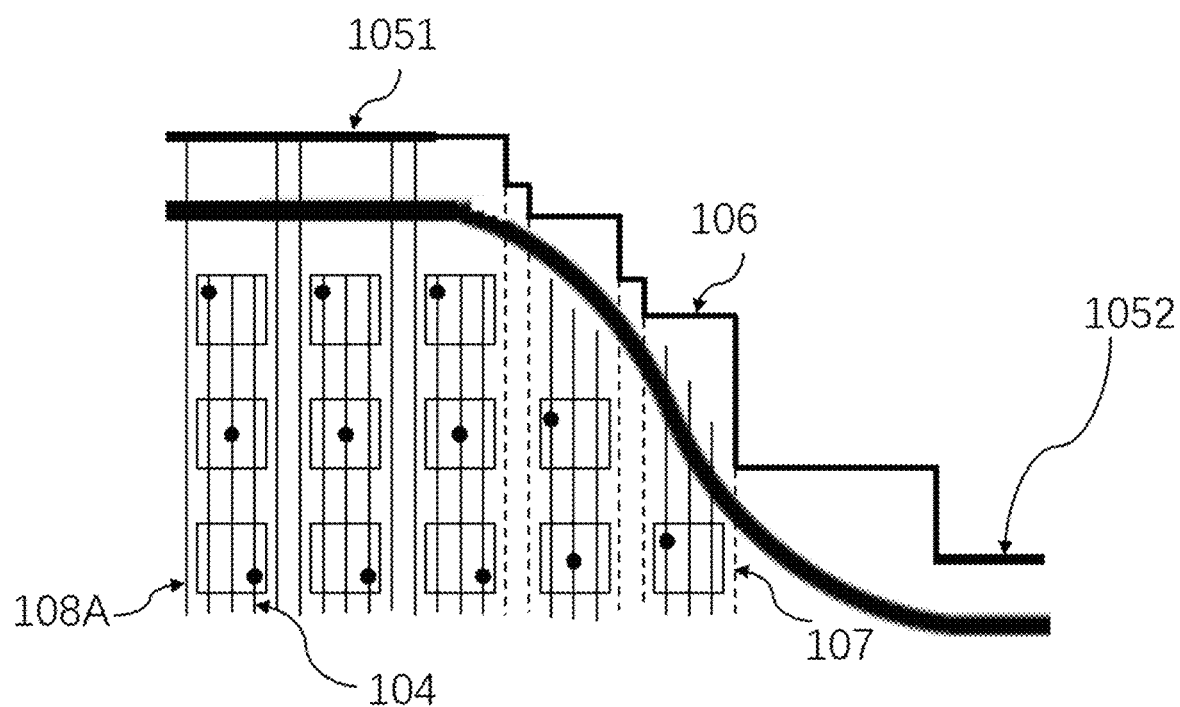
FIG. 2 is an enlarged diagram of a region Q of FIG. 1.
Figure 3:
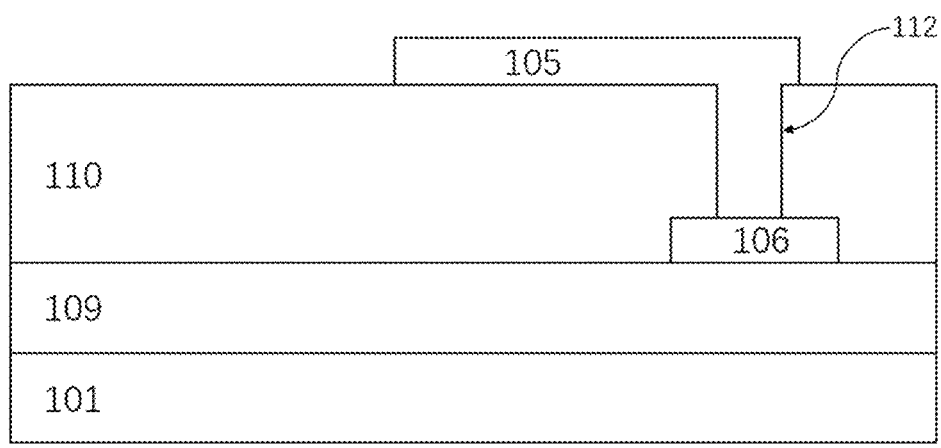
FIG. 3 is a connection diagram of a connection structure in one embodiment of the invention.

Hereinafter structure principle and working principle of the invention are described in details combining with the accompanying drawings:

FIG. 1 is a structural diagram of a touch display panel in one embodiment of the invention, FIG. 2 is an enlarged diagram of a region Q of FIG. 1, and FIG. 3 is a connection diagram of a connection structure in one embodiment of the invention. As shown in FIGS. 1 to 3, the touch display panel 100 of the invention comprises a substrate 101 having a display region AA and an opening region 102 corresponding to the display region AA. A plurality of pixel units (not shown) and a plurality of touch electrodes 103 are respectively disposed in the display region AA in a matrix, and a plurality of signal lines 104 are electrically connected to the corresponding touch electrode 103, respectively. At an outer side of the display region AA, a common voltage loop 105 surrounds the display region AA for receiving a common voltage (COM), and has a first portion 1051 and a second portion 1052 spaced apart and adjacent to the opening region 102, i.e., the first portion 1051 and the second portion 1052 are disconnected.

In the invention, the opening region 102 comprises a bottom side and opposite two lateral sides, the second portion 1052 is adjacent to the bottom side of the opening region 102, and the first portion 1051 and the second portion 1052 are spaced apart at the two lateral sides, i.e., the first portion 1051 and the second portion 1052 are not connected or disconnected at the two lateral sides. As shown in FIG. 1, in this embodiment, a part of the first portion 1051 surrounds other lateral sides of the display region AA, in addition to the side of the opening region 102, and another part of the first portion 1051 surrounds two sides adjacent to the opening region 102. Of course, it is also possible to have other arrangements, but the invention is not limited thereto.

In the invention, the touch display panel 100 is further provided with a connection structure 106 between the first portion 1051 and the second portion 1052 of the common voltage loop 105, and the first portion 1051 and the second portion 1052 are electrically connected through the connection structure 106. In such way, the first portion 1051, the second portion 1052 and the connection structure 106 are cooperated to form a complete loop structure, and have a common voltage (COM) to shield interference of signals of the peripheral region on the display region AA, and enhance protection to circuits in the display region AA.

In the invention, a vertical projection of the connection structure 106 on the substrate 101 is step-shaped, and also can be other shapes, such as, an arc or a curve, but the invention is not limited thereto. As shown in FIG. 2, opposite two lateral sides of the opening region 102 are in a smooth arc shape, and shape of the corresponding lateral side of the connection structure 106 is extended, i.e., an overall wiring tendency of the connection structure 106 is matched with shape of the two lateral sides of the opening region 102.

Further, the touch display panel 100 further has a plurality of first dummy signal lines 107, and the plurality of first dummy signal lines 107 may correspond to the connection structure 106. As shown in FIGS. 1 and 2, the first dummy signal lines 107 are electrically connected to the connection structure 106, and then electrically connected to the common voltage loop 105. Accordingly, one end of the first dummy signal lines 107 adjacent to the opening region 102 in a floating state also can be electrically connected to the common voltage loop 105, such that the first dummy signal lines 107 can be kept at a common voltage (COM), which can avoid occurrence of bright line in the display region, and improve display quality, and also can receive the common voltage (COM) via the first dummy signal lines 107 to enhance a restoring force of the common voltage in the display region AA and improve quality of the touch display panel 100 (e.g., enhancing display effect in the common display phase).

In the invention, the opening region 102 is adjacent to the display region AA, the display region AA at least partially surrounds the opening region 102, and shapes and positions of the display region AA and the opening region 102 can be set according to requirements, but the invention is not limited thereto.

Specifically, as shown in FIG. 2, in the touch display panel 100 of the invention, a vertical projection of the connection structure 106 on the substrate 101 is step-shaped. The vertical projection of the connection structure 106 on the substrate 101 is located between vertical projections of the first portion 1051 and the second portion 1052 on the substrate 101, and the connection structure 106 has one end connected to the first portion 1051, and the other end connected to the second portion 1052.

As shown in FIGS. 1 and 2, the first dummy signal lines 107 extend along a first direction F1, and have a first end 1071 and a second end 1072 opposite to each other, the first end 1071 is one end connected to the connection structure 106 shown in FIGS. 1 and 2 (i.e., the first end 1071 is one end of the touch display panel 100 adjacent to a side U of the opening region 102, see an upper end in FIG. 1), and the second end 1072 is one end far away from the connection structure 106 (i.e., the second end 1072 is one end of the touch display panel 100 adjacent to a side D opposite to the side of the opening region 102, see a lower end in FIG. 1).

As shown in FIG. 1, the common voltage loop 105 of the touch display panel 100 adjacent to the side D opposite to the side of the opening region 102 is a continuous structure, such that the second end 1072 of the first dummy signal lines 107 is directly electrically connected to the common voltage loop 105. In other words, in a region corresponding to the connection structure 106, the upper end of the first dummy signal lines 107 is indirectly connected to the common voltage loop 105 via direct electrical connection to the connection structure 106, and the lower end may be directly electrically connected to the common voltage loop 105.

In the invention, since the first end 1071 of the first dummy signal lines 107 adjacent to the opening region 102 is electrically connected to the connection structure 106, electrical connection with the common voltage loop 105 is achieved via the connection structure 106, so as to receive the common voltage, and the second end 1072 of the first dummy signal lines 107 may be electrically connected to the common voltage loop 105 at one side far away from the opening region 102. Accordingly, even if the second end 1072 of the first dummy signal lines 107 and the common voltage loop 105 at one side far away from the opening region 102 are disconnected during use or detection, the first dummy signal lines 107 still may keep electrical connection with the common voltage loop 105 via the connection structure 106 to sustain the potential itself to a common potential, thereby avoiding influence of potential of other film layers in a floating state, producing the problem of bright line, and ensuring display quality.

Referring to FIGS. 1 and 2 again, in a region corresponding to the first portion 1051 of the common voltage loop 105 in a second direction F2, the touch display panel 100 further comprises a plurality of second dummy signal lines 108A, and in a region corresponding to the second portion 1052 of the common voltage loop 105, further comprises a plurality of third dummy signal lines 108B, and in the second direction F2, the first dummy signal lines 107 are provided between the second dummy signal lines 108A and the third dummy signal lines 108B. The first direction F1 intersects the second direction F2. In this embodiment, the first direction F1 is perpendicular to the second direction F2, but the invention is not limited thereto.

As shown in FIGS. 1 and 2, the second dummy signal lines 108A extend along the first direction F1, and have a first end 1081 and a second end 1082 opposite to each other. The difference from the first dummy signal lines 107 is that the first end 1081 and the second end 1082 of the second dummy signal lines 108A are directly electrically connected to the common voltage loop 105. Specifically, the first end 1081 of the second dummy signal lines 108A is electrically connected to a part adjacent to the opening region 102 in the first portion 1051, and the second end 1082 of the second dummy signal lines 108A is electrically connected to a part adjacent to an opposite side of the opening region 102 in the first portion 1051.

Similarly, the third dummy signal lines 108B extend along the first direction F1, and have a first end 1083 and a second end 1084 opposite to each other. The difference from the second dummy signal lines 108A is that the third dummy signal lines 108B have the first end 1083 electrically connected to the second portion 1052, and the second end 1084 electrically connected to a part adjacent to an opposite side of the opening region 102 in the first portion 1051.

In the invention, in the region corresponding to the connection structure 106, the first dummy signal lines 107 in the touch display panel 100 is interlaced with a part of the signal lines 104, and after electrically connected to the corresponding touch electrode 103, the part of the signal lines 104 continues to extend to be adjacent to the connection structure 106, but does not contact or connected to the connection structure 106, i.e., the signal lines 104 and the connection structure 106 are electrically isolated.

In the invention, the signal lines 104, the first dummy signal lines 107 and the connection structure 106 are located at the same film layer, such as, a metal layer, and still further, it may be a third metal layer (M3) or a second metal layer (M2). Accordingly, the signal lines 104, the first dummy signal lines 107 and the connection structure 106 may be formed in different regions of the touch display panel 100 via the same process. As shown in FIG. 2, the connection structure 106 and the plurality of first dummy signal lines 107 are in a comb shape after forming via the same process. The common voltage loop 105 is formed of a transparent conductive layer, such as, a first transparent conductive film layer (ITO1) or a second transparent conductive film layer (ITO2), such that the common voltage loop 105 and the connection structure 106 are located at different film layers. In order to achieve electrical connection between the connection structure 106 and the common voltage loop 105, i.e., electrical connection between the first portion 1051 and the second portion 1052 at both ends of the connection structure 106, the invention may use the way of across layer connection, such as, the connection way in FIG. 3.

As shown in FIG. 3, the touch display panel 100 further comprises a first insulating layer 109 disposed on the substrate 101, a connection structure 106 disposed on the first insulating layer 109, a second insulating layer 110 disposed on the first insulating layer 109 and covering the connection structure 106, and a common voltage loop 105 disposed on the second insulating layer 110. In this embodiment, the connection structure 106 is a metal layer, and the common voltage loop 105 is a transparent conductive layer (ITO), but the invention is not limited thereto. As shown in FIG. 3, the second insulating layer 110 is provided with an opening 112 exposing a part of the connection structure 106, and the transparent conductive layer where the common voltage loop 105 is located extends into the opening 112 and contacts the part of the connection structure 106 exposed, such that electrical connection between the common voltage loop 105 and the connection structure 106 is achieved.

Figure 4:
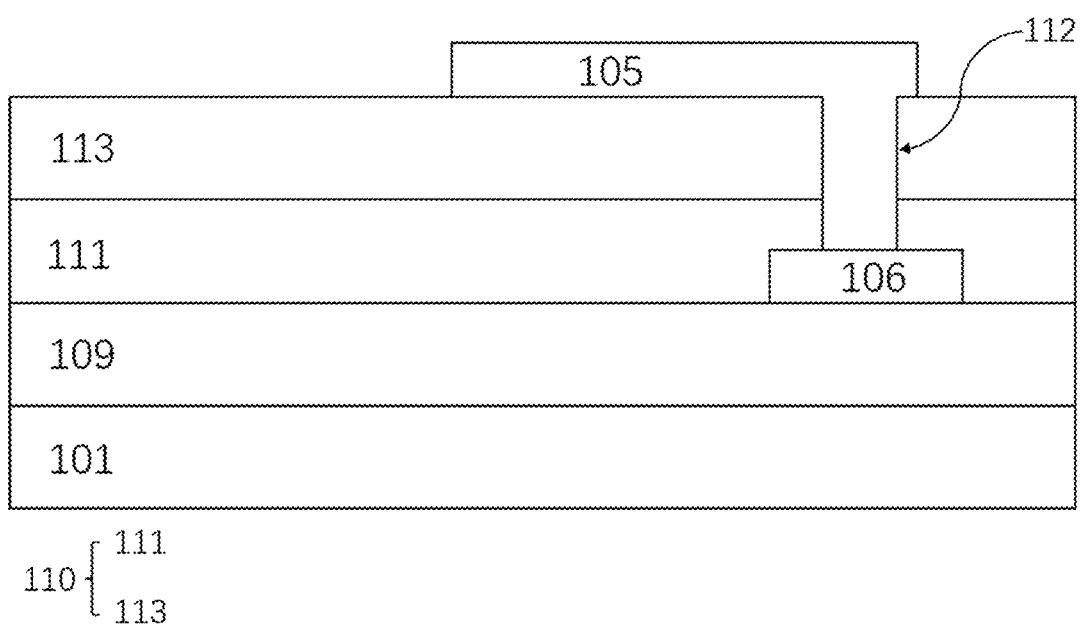
FIG. 4 is a connection diagram of a connection structure in another embodiment of the invention.

In another embodiment, referring to FIG. 4, FIG. 4 is a connection diagram of a connection structure in another embodiment of the invention. The difference from FIG. 3 is that the second insulating layer 110 is not a single insulating layer, and comprises a first sub-insulating layer 111 and a second sub-insulating layer 113. As shown in FIG. 4, the touch display panel 100 comprises a first insulating layer 109 disposed on the substrate 101, the connection structure 106 disposed on the first insulating layer 109, the first sub-insulating layer 111 disposed on the first insulating layer 109 and covering the connection structure 106, the touch electrode 103 disposed on the first sub-insulating layer 111, the second sub-insulating layer 113 disposed on the first sub-insulating layer 111 and covering the touch electrode 103, and the common voltage loop 105 disposed on the second sub-insulating layer 113. In the invention, the touch electrode 103, for example, may use a first transparent conductive layer (ITO1), and the common voltage loop 105, for example, may use a second transparent conductive layer (ITO2), but the invention is not limited thereto. As shown in FIG. 4, the first sub-insulating layer 111 and the second sub-insulating layer 113 are provided with an opening 112 exposing a part of the connection structure 106, and the second transparent conductive film layer (ITO2) where the common voltage loop 105 is located extends into the opening 112 and contacts the part of the connection structure 106 exposed, such that electrical connection between the common voltage loop 105 and the connection structure 106 is achieved.

The invention further provides a method for manufacturing a display panel, and as shown in FIGS. 1 to 3, the manufacturing method of the invention comprises steps of:

S1, providing a substrate 101 having a display region AA and an opening region 102 adjacent to each other, the display region AA at least partially surrounding the opening region 102;

S2, forming a plurality of signal lines 104 and a plurality of first dummy signal lines 107 on the substrate 101; and S3, forming a plurality of touch electrodes 103 arranged in a matrix in the display region AA, each of the touch electrodes 103 electrically connected to one signal line 104, respectively.

Further, the manufacturing method further comprises step S4 of forming a common voltage loop 105 on the substrate 101, the common voltage loop 105 surrounding the display region AA, and having a first portion 1051 and a second portion 1052 spaced apart and adjacent to the opening region 102, such that the connection structure 106 is electrically connected to the first portion 1051 and the second portion 1052 of the common voltage loop 105; and forming a connection structure 106 electrically connected to the plurality of first dummy signal lines 107.

In one embodiment, the connection structure 106, the signal lines 104 and the first dummy signal lines 107 are disposed on the same layer, so the connection structure 106 is formed in the step S2. In one embodiment, a layer where the common voltage loop 105 is located is above a layer where the touch electrode 103 is located, so the step S4 is performed after the step S3, i.e., the common voltage loop 105 is formed after the touch electrode 103 is formed (a pixel electrode also may be formed on the same layer). In another embodiment, the layer where the common voltage loop 105 is located is below the layer where the touch electrode 103 is located, so the step S4 is performed after the step S3, i.e., the touch electrode 103 is formed after the common voltage loop 105 is formed (a pixel electrode also may be formed on the same layer). In still another embodiment, the common voltage loop 105 and the touch electrode 103 are disposed on the same layer, so the step S4 and the step S3 are performed simultaneously.

Each of the first dummy signal lines 107 extends along the first direction F1, and has a first end 1071 and a second end 1072 opposite to each other, and the first dummy signal line 107 has the first end 1071 electrically connected to the connection structure 106, and the second end electrically connected to the common voltage loop 105 (specifically, the common voltage loop 105 at a side opposite to the opening region 102).

In the invention, the signal lines 104, the first dummy signal lines 107 and the connection structure 106 are located at the same film layer, such as, a metal layer, and still further, it may be a second metal layer (M2) or a third metal layer (M3). In one embodiment, the touch electrode 103, for example, may use a first transparent conductive layer (ITO1), and the common voltage loop 105, for example, may use a second transparent conductive layer (ITO2), but the invention is not limited thereto. As shown in FIG. 4, the connection structure 106 is formed on the first insulating layer 109 of the substrate 101, the second insulating layer 110 comprises a first sub-insulating layer 111 disposed on the first insulating layer 109 and covering the connection structure 106, the touch electrode 103 disposed on the first sub-insulating layer 111, and a second sub-insulating layer 113 disposed on the first sub-insulating layer 111 and covering the touch electrode 103, the common voltage loop 105 disposed on the second sub-insulating layer 113. The first sub-insulating layer 111 and the second sub-insulating layer 113 are provided with an opening 112 exposing a part of the connection structure 106, and the second transparent conductive film layer (ITO2) where the common voltage loop 105 is located extends into the opening 112 and contacts the part of the connection structure 106 exposed, such that electrical connection between the common voltage loop 105 and the connection structure 106 is achieved.

According to the embodiments of the invention, it can be ensured that the common voltage loop forms a complete loop structure to protect circuits in the display region AA, and also can electrically connect the floating dummy signal lines to the common voltage loop via the connection structure through electrical connection of the common voltage loops spaced apart via the connection structure, such that the dummy signal lines can be kept at a common voltage (COM), thereby avoiding occurrence of bright line in the display region, and enhancing display quality.

Of course, the invention may further have various other embodiments, and without departing from spirit and essence of the invention, those skilled in the art shall make various corresponding modifications and variations according to the invention, but these corresponding modifications and variations shall belong to the scope of protection of the appended claims of the invention.

What is claimed is:

1. A touch display panel, comprising:
   a substrate;
   a display region disposed on the substrate;
   an opening region disposed on the substrate and adjacent to the display region;
   a plurality of touch electrodes disposed in the display region;
   a plurality of signal lines electrically connected to the touch electrodes;
   a common voltage loop surrounding the display region and having a first portion and a second portion spaced apart and adjacent to the opening region; and
   a connection structure disposed between the first portion and the second portion;
   wherein the first portion is electrically connected to the second portion through the connection structure; and
   a vertical projection of the connection structure on the substrate is step-shaped.

2. The touch display panel according to claim 1, wherein the touch display panel further comprises a plurality of first dummy signal lines electrically connected to the connection structure, the signal lines, the first dummy signal lines and the connection structure are located at the same film layer.

3. The touch display panel according to claim 2, wherein the film layer is a metal layer.

4. The touch display panel according to claim 3, wherein the common voltage loop is located at a transparent conductive layer, and the touch display panel further comprises:
   a first insulating layer disposed on the substrate, the metal layer disposed on the first insulating layer, and the connection structure disposed at the metal layer; and
   a second insulating layer disposed on the first insulating layer and covering the metal layer, the transparent conductive layer disposed on the second insulating layer, the second insulating layer having an opening exposing a part of the connection structure, and the transparent conductive layer where the common voltage loop is located extending into the opening and contacting the part of the connection structure exposed.

5. The touch display panel according to claim 1, wherein the touch display panel further comprises a plurality of first dummy signal lines electrically connected to the connection structure, each of the plurality of first dummy signal lines has a first end and a second end opposite to each other, the first end is electrically connected to the connection structure, and the second end is electrically connected to the common voltage loop.

6. The touch display panel according to claim 1, wherein the touch display panel further comprises a plurality of second dummy signal lines electrically connected to the common voltage loop.

7. The touch display panel according to claim 1, wherein the opening region comprises a bottom side and opposite two lateral sides, the second portion is adjacent to the bottom side, and the first portion and the second portion are spaced apart at the two lateral sides.

8. The touch display panel according to claim 1, wherein the vertical projection of the connection structure on the substrate is located between vertical projections of the first portion and the second portion on the substrate.

9. The touch display panel according to claim 1, wherein the connection structure and the common voltage loop are located at different film layers.

10. A method for manufacturing a display panel, comprising:
providing a substrate having a display region and an opening region adjacent to each other;
forming a plurality of signal lines in the display region; and
forming a plurality of touch electrodes in the display region, the plurality of touch electrodes electrically connected to the plurality of signal lines; wherein,
the manufacturing method further comprises forming a common voltage loop on the substrate, the common voltage loop surrounding the display region, and having a first portion and a second portion spaced apart and adjacent to the opening region; and forming a connection structure electrically connected between the first portion and the second portion, and a vertical projection of the connection structure on the substrate is step-shaped.

11. The method according to claim 10, wherein the manufacturing method further comprises forming a plurality of first dummy signal lines in the display region, and the plurality of first dummy signal lines are electrically connected to the connection structure, each of the plurality of first dummy signal lines has a first end and a second end opposite to each other, the first end is electrically connected to the connection structure, and the second end is electrically connected to the common voltage loop.

12. The method according to claim 10, wherein the manufacturing method further comprises forming a plurality of first dummy signal lines in the display region, and the plurality of first dummy signal lines are electrically connected to the connection structure, the signal lines, the first dummy signal lines and the connection structure are located at the same film layer.

* * * * *